June 17, 1947.  L. J. KOCI  2,422,199

TEMPERATURE RESPONSIVE CONTROL MECHANISM

Filed June 12, 1941  6 Sheets-Sheet 1

Inventor:
Ludvik J. Koci
By McCanna, Hintersorn & Morsbach
Attys.

June 17, 1947. L. J. KOCI 2,422,199
TEMPERATURE RESPONSIVE CONTROL MECHANISM
Filed June 12, 1941 6 Sheets-Sheet 2

Inventor:
Ludvik J. Koci
By
McCanna, Hintercera & Morsbach
Attys.

June 17, 1947.  L. J. KOCI  2,422,199

TEMPERATURE RESPONSIVE CONTROL MECHANISM

Filed June 12, 1941  6 Sheets-Sheet 5

Inventor:
Ludvik J. Koci
By McCanna, Wintercorn & Marshack
Attys.

Patented June 17, 1947

2,422,199

UNITED STATES PATENT OFFICE 2,422,199

TEMPERATURE RESPONSIVE CONTROL MECHANISM

Ludvik J. Koci, Chicago, Ill., assignor to Sunbeam Corporation, a corporation of Illinois Application June 12, 1941, Serial No. 397,772

36 Claims. (Cl. 161—1)

This invention relates to temperature responsive control mechanism in the nature of a thermal timer adapted for general application and particularly to electric cooking devices such as bread toasters and similar devices wherein the cooking interval is automatically terminated.

This is a continuation in part of my copending application Serial No. 183,890, filed January 7, 1938, which has been abandoned in favor of the present application.

In the toasters of the prior art, successive toasting intervals have not been timed with an accuracy such as might be desired or anywhere near approaching the theoretically perfect. At best this timing has been a rough approximation. This has been because of the large number of variables involved, the difficulty lying both in variables within the toaster and in the conditions under which the device is used. For example, one of the reasons for lack of uniform operation has been the variable effect of friction upon the timing period and the resultant variation in the power required to operate the device. The effect of friction on the operating time must be held at a minimum because of its inconsistent nature, for it is well known to those skilled in the manufacture of heating appliances, rubbing surfaces at high temperatures present a very much more serious condition than encountered under atmospheric temperatures. Furthermmore, the power of such a thermally responsive device is small and consequenly relatively small variations in the power requirements produce relatively great variations in the toasting interval.

Another common reason for the lack of uniform operation has been variations in the voltage of the power supply to the device. Such variations frequently occur in the power lines to which cooking devices are connected, for the reason that there are often several high wattage cooking devices used in a kitchen simultaneously, such, for example, as a toaster and a coffee maker, and when used on the same circuit the voltage will vary depending upon whether one or both of the appliances are in use.

Still further serious difficulty in toasters and similar cooking appliances dependent upon a thermal timer for measuring the cooking interval lies in the fact that with a device such as a toaster the timing intervals start at different initial temperatures of the toaster. In other words, the first interval will start from a cold toaster in which the ambient temperature of the thermally responsive element is substantially atmospheric temperature, whereas successive toasting intervals will start from a higher ambient temperature depending upon the length of the waiting period between the toasting intervals. I am aware that numerous attempts have been made to produce cooking devices in which compensation to a degree has been effected for this variation in the starting temperature, but so far as I am aware, no timing device has been produced in which all of the above mentioned objections are overcome through the inherent characteristics of the timer.

An object of the invention is the provision of a cooking device of the character described having a generally improved control mechanism. I have also aimed to provide a cooking device having a thermostat control mechanism wherein the frictional effects of the mechanism are materially reduced to produce improved accuracy of operation.

A further object of the invention is the provision of a control mechanism wherein variations in the line voltage to the device to be controlled are compensated for in large part.

Another object of the invention is the provision of a thermostat control wherein compensation is made for the change in ambient temperature resulting from successive operations of the device to be controlled.

I have further aimed to materially simplify the thermostat control for cooking devices and the like, to make the same self-compensating, and to produce positively acting thermostat mechanism from low temperature, slow acting thermostat ply metal.

I have still further aimed to provide a cooking device or other controlled device wherein the thermostat control functions through a series of cycles during the cooking operation whereby to minimize the timing errors and more accurately control the cooking period.

Another object of the invention is the provision of a thermal timer for use in electric devices such as toasters and under analogous conditions having a thin ply metal thermostatic strip of low time constant to provide the timer with the large deflection, fast cooling and other properties of such a strip wherein the faults inherent in the operation of a thermostat of such form are avoided by oscillating the temperature of the strip in the linear portion of its time-temperature curve during each timing interval to prolong the effective time lag.

A still further object of the invention is the provision of a thermal timer embodying a thermally responsive element having a relatively low ratio of mass to surface area wherein the operating range of the timer is materially above the maximum temperature of its surroundings, and wherein heating of the thermally responsive element is successively terminated at a temperature about or below 80% of its equilibrium temperature and reheating thereof is repeatedly started when the element has cooled to about or above 20% above the ambient temperature, expressed in terms of percent, of the range between its equilibrium temperature and the ambient temperature.

Other objects and advantages will appear from the following description and the accompanying drawings, in which—

Figure 1:
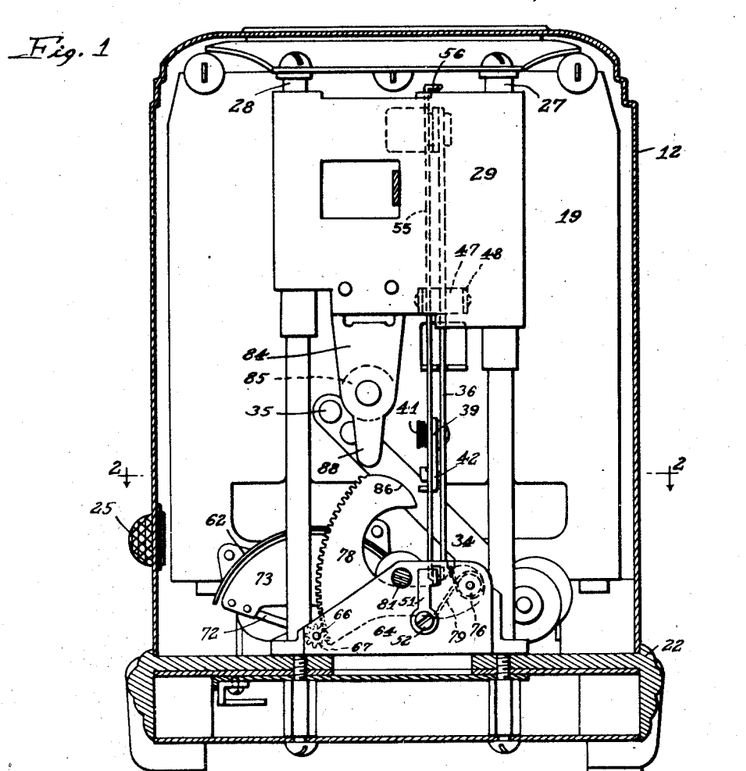
Figure 1 is an end view of a toaster embodying my invention showing the face of the control mechanism, the shell and base of the toaster being in section.

The toaster herein contemplated is of the same general class as that disclosed in my copending application, Serial No. 39,957, filed September 10, 1935, now Patent No. 2,197,221, of which this is a continuation in part, the oven or casing, the toasting elements and the manner of inserting and removing the bread therefrom being in general the same as those of said application to which reference is made for a more detailed description of the general toaster construction. The toaster has a casing designated generally by the numeral 12 provided with spaced slots 13 on its upper side for the insertion of slices of bread to rest on bread carriers 14 and 15 (Fig. 3) between toasting elements designated generally by the numerals 16, 17 and 18, which are supported on end plates 19, only one of which is shown. The casing 12 is carried on a base member 22, in this instance of synthetic resin, such as "Bakelite," having a reinforcing plate 23. Handles are positioned on the ends of the casing, one of the handles designated 24 being movable between the position shown in Fig. 5 and that shown in Fig. 7 for the purpose of inserting and removing the bread as will more fully appear. A lens or similar device 25 is inserted in the side of the casing and serves with a coil 26 to indicate the operative condition of the toasting mechanism. The end plates or frame members 19 are supported at their lower ends in the plate 23 and at their upper ends by means of a pair of rods at each end of the toaster designated by the numerals 27 and 28 (Figure 1). The racks 14 and 15 are supported on a carrier 29 which is in turn slidably supported on the rods 27 and 28 for movement with the handle 24 between the positions of Figs. 5 and 7.

Figure 4:
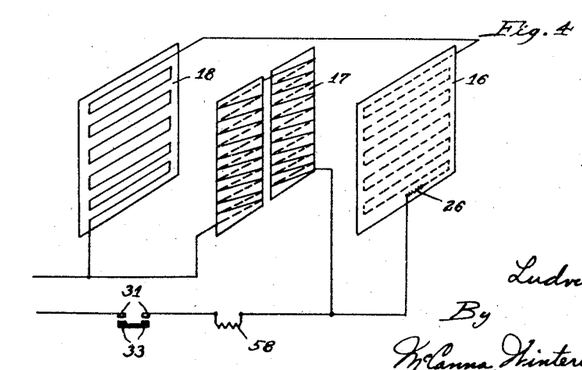
Fig. 4 is a wiring diagram of the toaster shown in Figs. 1 to 3.

The supply of electrical energy through the toaster is controlled through a pair of contacts 31 (Fig. 2) connected to leads 32 of the toaster circuit in the manner best shown in Fig. 4, the contacts 31 being closed and opened by engagement therewith of a pair of electrically interconnected contacts 33 carried on and insulated from a switch lever 34. The switch lever 34 is of spring metal, is connected at the end thereof opposite the contacts 33 as shown at 35, to the frame plate 19, and is normally tensioned to move the contacts 33 away from the contacts 31 and maintain the switch open. A switch arm 36 is pivotally supported from spaced ears 37 (Fig. 7) on plate 19 and extends downward to a point adjacent the bottom of the toaster. The arm 36 has a cam surface 38 opposite the switch lever 34 positioned to bear thereagainst to effect the closing of the switch. A bell crank lever 39 is articulated on a pin 41 secured in the arm 36 and has a leg 42 adapted to bear against a lug 43 on the arm 36, a spring 44 normally maintaining the lever in such position. The lever also has a leg 45 projecting beyond the forward edge of the arm 36 and is provided with a cam surface 46 adapted to be engaged by a roller 47 carried on the carrier 29 by means of ears 48 whereby upon downward movement of the carrier 29 the roller 47 engages the cam face 46 moving the arm 36 in a clockwise direction facing Figs. 5 to 7 from the position shown in Fig. 5 to the position shown in Fig. 7, thereby closing the contacts 31 and 33. The bell crank member 39 rotates on the pin 41 to permit return movement of the roller 47. The lower end of the arm 36 is bent laterally to provide a lug 49 as best shown in Figs. 8 to 11. A latch 51 is loosely supported as at 52 on an upright side member 64 described hereinafter and extends over the lug 49, the latch having a notch 53 for reception of the lug 49, a spring 54 urging the latch member against the lug so that when the lever 36 is urged inward closing the contacts 31 and 33, the lug 49 is received in the slot 53 to retain the arm 36 in the switch closing position. A wire 55 is carried on the latch 51 and extends upwardly through the carrier 29 (Fig. 7), the upper end thereof being bent laterally as shown at 56 (Fig. 1) for engagement by the upper edge of the carrier whereby upon movement of the carrier to the extreme uppermost position the latch 51 is released causing the contacts to open. This permits manual termination of the toasting operation at any desired time. The arm 36 has a shoulder 57 on its forward edge above the bell crank lever 39 for the purpose of engaging the roller 47 and retaining the carrier 29 in the uppermost position, if desired, as shown in Fig. 5.

Figure 2:
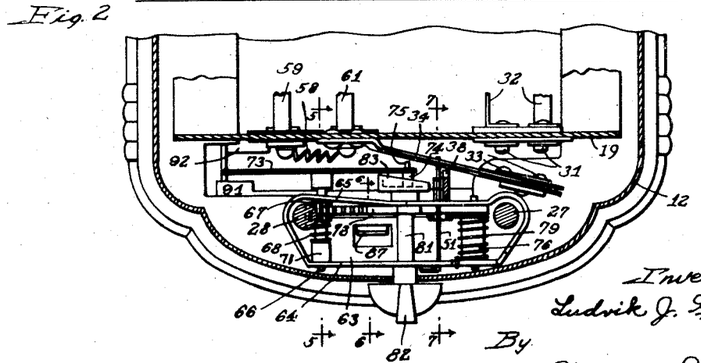
Fig. 2 is a fragmentary section substantially on the line 2—2 of Figure 1.
Figure 3:
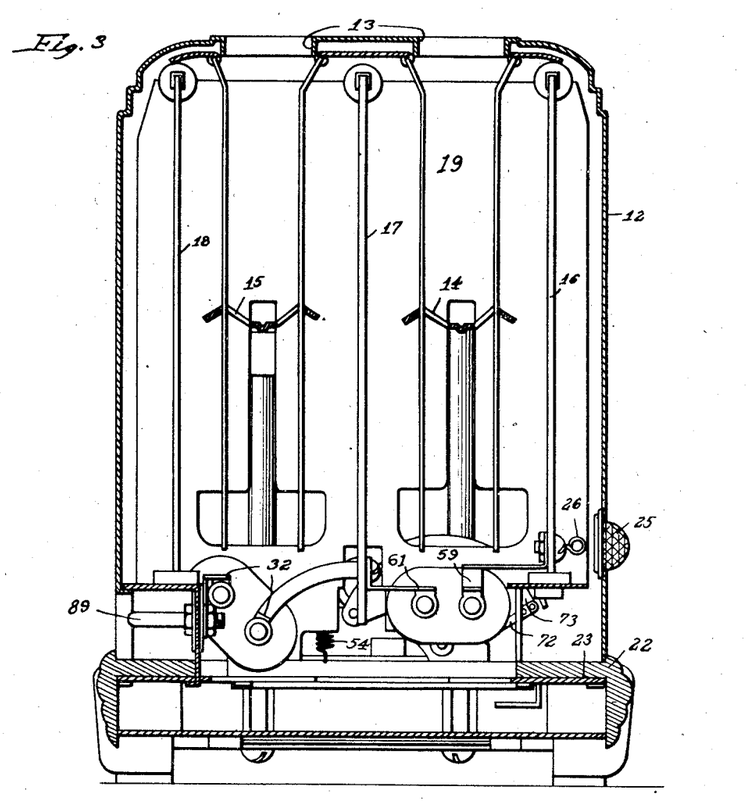
Fig. 3 is a vertical section transversely through a toaster embodying my invention showing the back of the control mechanism in elevation.

The control mechanism includes a secondary heating element comprising a coil 58 of resistance wire supported on the frame member 19 adjacent its lower edge, electrical energy being supplied thereto through conductors 59 and 61 as shown in Figs. 2 and 3, in proportion to the current supplied to the heating elements. An arcuate shield 62 is secured to the frame member 19 and partially shields the coil 58.

A U-shaped control support having a central base 63 and upright side members 64 and 65 is seated against the base member 22 and secured thereagainst by contact of shoulders on the rods 27 and 28 as will be apparent from Figure 1. Journaled in the side members 64 and 65 is a pin 66 having a pinion 67 rotatable thereon and a coiled spring 68 attached at one end of the pinion 67 and encircling the pin 66, the opposite end of the coil spring abutting against a shoulder 69 on a collar 71 fixed on the pin 66, the pinion, spring and collar being interposed between the side members 64 and 65 as best shown in Fig. 2. The pin 66 extends beyond the side member 65 and on the end thereof has a laterally extending arm 72 at the outer end of which is affixed a thermostat ply metal element 73 positioned in a plane transverse to the pin 66 and of general arcuate shape as best shown in Figs. 8 to 11. The free end of the ply metal element has outwardly extending pins 74 and 75 for a purpose presently to be described. The pin 66 and the arm 72 are so positioned and proportioned as to support the element 73 in a position opposite the coil 58 in one position of the element as will presently be described. A pin 76 is supported between the side members 64 and 65 and receives a hub 77 of a gear segment 78 positioned and shaped to engage the pinion 67 and has a coil spring 79 acting between the gear segment and the side member 64, as best shown in Fig. 2, tensioned to urge the segment in a clockwise direction facing Figure 1, and thus arranged to rotate the pinion 67 in a counterclockwise direction. Also carried on the side members 64 and 65 is a shaft 81 having a handle 82 projecting beyond the casing 12 (Fig. 2) and likewise projecting beyond the plate 65 and carrying a cam 83 fixedly thereon in the path of the pin 74 of the thermostat or ply metal element 73. By rotating the handle 82, the cam 83 is rotated so that more or less of the cam surface thereof is brought into the path of movement of the pin 74 as will presently be more fully described.

Figures 5, 6:
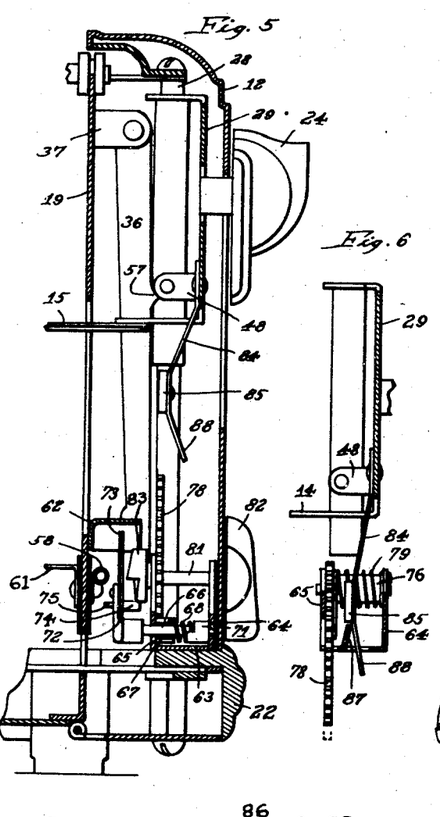
Fig. 5 is a section on the line 5—5 of Fig. 2.
Fig. 6 is a section on the line 6—6 of Fig. 2.
Figure 7:
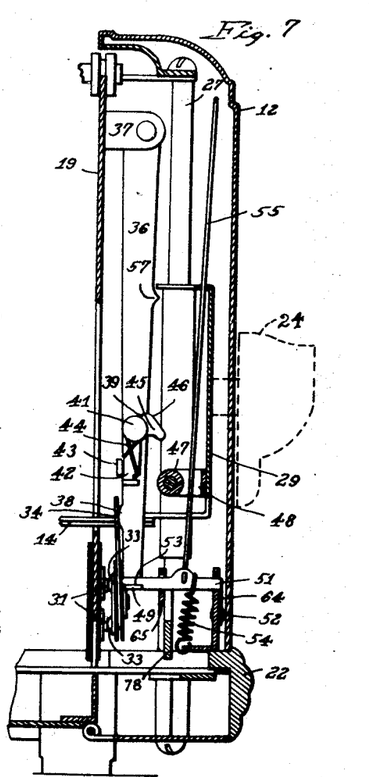
Fig. 7 is a section on the line 7—7 of Fig. 2.
Figure 8:
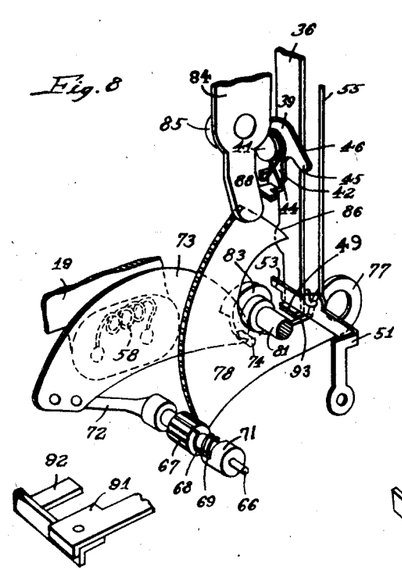
Fig. 8 is a fragmentary view of the control mechanism showing the parts in their normal "off" position.
Figure 9:
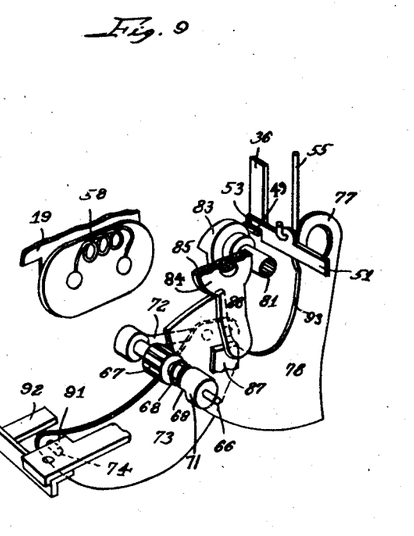
Fig. 9 shows the parts at an intermediate point between the "off" and the "on" position showing the manner in which the parts are tensioned.
Figure 10:
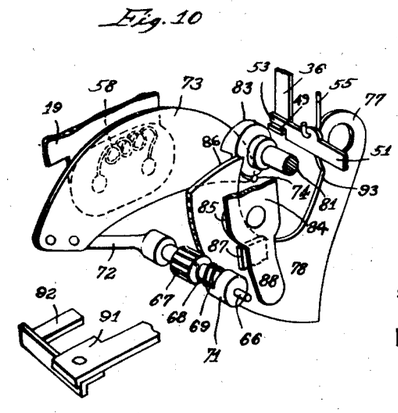
Fig. 10 is a fragmentary view showing the parts in the "on" position.
Figure 11:
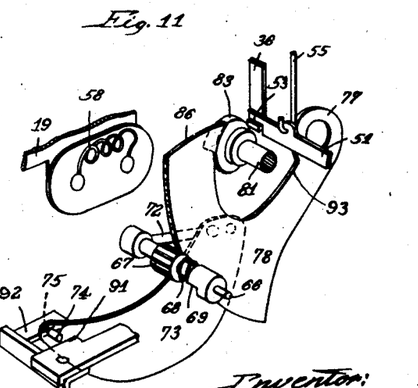
Fig. 11 is a fragmentary view showing the parts at an intermediate thermostat cooling position, prior to the return of the parts to the position of Fig. 8.

Attached to the lower edge of the carrier 29 is a depending finger 84 of spring metal or other resilient material, the finger carrying a roller 85 positioned to engage the upper edge 86 of the gear segment 78 as the carrier is moved downward to the position shown in Figs. 6 and 7. The bottom portion 63 has an upwardly extending flange 87 adapted to be engaged by the lower end 88 of the finger 84 adjacent the lower end of the carrier movement in the manner shown in Fig. 6, whereby the finger 84 is bent forward so that the roller 85 slips off the edge 86 of the gear segment 78, thus releasing the gear segment for its return movement.

In operation the toaster functions in the following manner: Slices of bread are inserted on one or both of the bread racks 14 and 15 with the racks in the position shown in Figs. 3 and 5 with the connector prongs 89 connected to a suitable source of supply. The handle 24 is then moved downward to the position shown in Fig. 7. During this downward movement the roller 47 engages the cam face 46, rotating the arm 36 in a clockwise direction facing Figs. 5 and 7 thereby closing the contact points 33 and 31. Simultaneously the lug 49 seats in the notch 53 so as to retain the arm 36 in the position shown in Figs. 7 and 9 and to maintain the contacts closed. During this movement the roller 85 engages the upper edge 86 of the gear segment 78 rotating the segment from the position shown in Fig. 8 to the position shown in Fig. 9. During this movement the pinion 67 rotates on the pin 66 in a clockwise direction and the spring 68 rotates on the pin with respect to the collar 71 in the manner of a ratchet. The resistance between the parts may be such as to rotate the pin 66 and the ply metal element 73 to the position shown in Fig. 9 in which the pin 74 engages the lower surface of an abutment 91, preventing further rotation of the pin and the ply metal element. As the handle and carrier 29 reach their lowermost position the roller is forced off the upper edge of the gear segment 78 by the flange 87, whereupon the spring 79 which has been tensioned by the rotation of the segment 78 urges the segment in the return direction, whereupon the pinion 67 and spring 68 rotate on the pin 66 until the end of the spring 68 comes against the abutment 69. Thereupon the pinion, spring and pin rotate in a counterclockwise direction facing Figure 1 and Figs. 8 to 11 until the pin 74 engages the cam 83, thus bringing the parts in the position shown in Fig. 10. Upon the closing of the contacts 31 and 33 current flows to the primary heating elements 16, 17 and 18 and simultaneously flows through the secondary heating coil 58. Heat is emitted by the coil 58 which affects the ply metal element 73 causing the element to warp toward the coil and in a direction to withdraw the pin 74 from contact with the cam 83. When this warpage has proceeded to a degree as determined by the position of the cam 83, the pin 74 will slide past the cam; and under the tension of the spring 79 acting through the parts 78, 67, 68, 71, and 66, the ply metal element 73 will rotate in a counterclockwise direction until the pin 75 on the ply metal element 73 strikes against an abutment 92. The space between the abutments 91 and 92 is only slightly greater than required for the passage of the ply metal element and the pins 74 and 75. This brings the parts to the position shown in Fig. 11, in which the ply metal element 73 is remote from the heating coil 58 and is uneffected by the heat generated thereby but instead is cooled by an upward flow of air from the bottom of the toaster caused by the rising current of air generated by the heating coil 58 and the cooking elements 16 to 18, inclusive. Under these circumstances the ply metal element cools and warps in the opposite direction until the pin 75 is moved longitudinally off the abutment 92, whereupon the pinion 67 and pin 66 and ply metal element 73 will rotate through another half turn until the pin 74 engages the cam 83, again bringing the ply metal element opposite the heating coil 58 and subject to its influence. The ply metal element again heats up until the pin 74 releases from the cam 83 and again the ply metal element rotates until the pin 75 strikes the abutment 92 in which position it again cools and rotates through a further half turn back to its original position, which operations are repeated until the portion 93 of the gear segment 78 abuts or strikes the latch 51 lifting the latch free of the lug 49 and allowing the arm 36 to move to the position shown in Fig. 5 under the action of the switch lever 14, thus opening the contacts 31 and 33 and terminating the toasting operation. It will be seen that the ply metal element 73 may be caused to go through any number of cycles including a heating step and a cooling step during the toasting interval by regulating the tension of the spring 79, the length of the gear segment 78 and the gear ratio between the gear segment and the pinion 67. In the present instance the device is arranged to pass through two cycles during each toasting interval, though in general the accuracy of operation increases with the number of cycles.

To insure the best results, it is desirable that the properties of the structure be so adjusted that the heating and cooling phases of the cycle occur within a pre-selected temperature range. The results to be obtained and the manner of obtaining them will best be understood from a discussion of the theory of operation of the device, and such a discussion will enable others skilled in the art to practice the invention in its various phases. It is well known that when a given mass of material, such, for example, as a thermally responsive element 73 is supplied with heat under uniform conditions at a constant rate, the temperature rise thereof under all but purely theoretical conditions will not proceed at a constant rate until a definite temperature is reached, but will instead rise at a progressively slower rate until an equilibrium temperature is reached at which the heat loss from the material to its surroundings is equal to the heat input. Since the heat loss at any instant is directly proportional to the difference in temperature between the body and its surroundings, the rate of temperature rise against time is graphically represented by an exponential curve. Theoretically the equilibrium temperature is probably never actually reached though very closely approached, and consequently for the sake of convenience it is common to refer to the so-called "time constant" of the system, which is equal to the time required for the temperature of the body to reach 63.2% of its equilibrium value.

The term "ambient temperature" as commonly used in engineering, refers to the temperature of the medium immediately surrounding the object in question. Thus in the present instance it refers to the temperature of the air in the enclosure in which the thermostat is placed. It will be seen that this temperature will vary in value from room temperature where the toasting operations begin with the toaster at room temperature, along a curve substantially represented by the line ABC in Fig. 19, where toast is being made continuously. Thus, because of this variation it is necessary that the value be considered as of the instant under consideration. From Fig. 19 it will be seen that upon continued operation of the toaster the ambient temperature approaches an equilibrium value of its own as represented by the portion BC, after the thermostat temperature approaches equilibrium or what amounts to the same thing, the enclosure as a whole has a considerably longer time constant than the thermostat itself.

Figure 19:
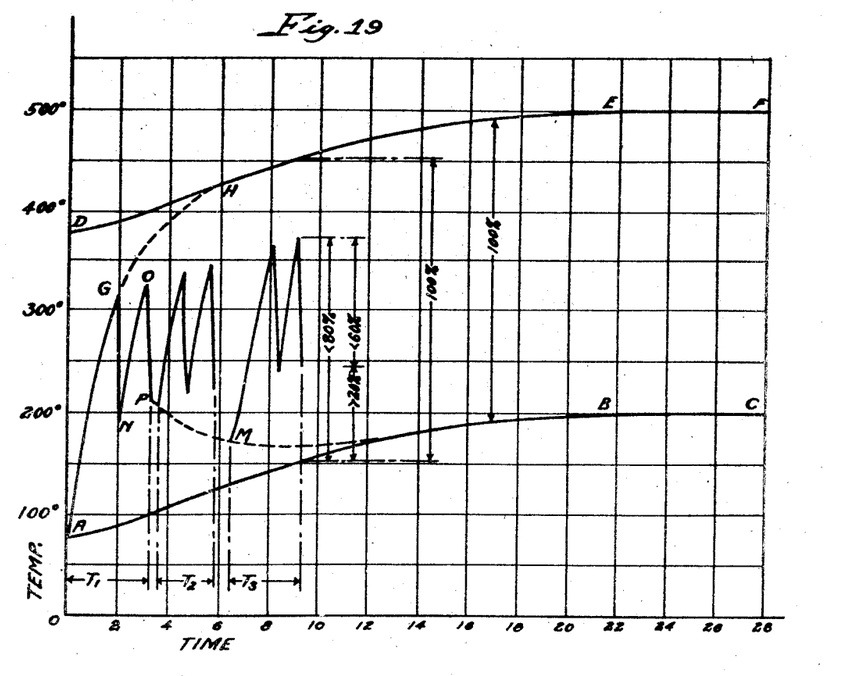
Fig. 19 is a curve showing the time and temperature characteristics of the thermostat.

It will be seen from the above that under the conditions prevailing in a toaster or other heating appliance the equilibrium temperature is not a fixed value but must be considered as the ultimate temperature rise above ambient reached by the thermostat under a given power input, for the reason that the ambient temperature is not constant. It will therefore be seen that in considering an equilibrium temperature it is also necessary to take into consideration the time factor. For example, if ten watts of electrical energy is delivered into a block of metal located in a given room, the metal will eventually reach a higher temperature in case the room temperature is 100° F. than in case the room temperature is 75°. In the first instance the equilibrium temperature will be very nearly 25° F. higher than in the second case. Thus, over a relatively low range of room temperatures the increase in value of the equilibrium temperature is approximately equal to the increase in room temperature. This situation holds substantially true under the present conditions, and the equilibrium temperature under a given unchanging input can be shown by the curve DEF of Fig. 19, which curve is the same distance above the curve ABC at every point. For the purpose of definition, this distance or range is herein referred to as being 100% and the value at any instant of the equilibrium temperature is referred to as being 100% above ambient. Thus, if a thermostat rises in temperature along the line AGHE of Fig. 19, it approaches equilibrium relative to its surroundings at point H, for although it continues to rise until it reaches point E, it is just as close in the area HE to equilibrium at every instant as it would be in the case of an unchanging surrounding temperature. Thus, throughout the application when I refer to a temperature of X% above ambient, I intend to specify a temperature which is equal in value to the instantaneous value of ambient temperature plus $$\frac{X}{100}(T_e - T_a)$$

where $T_e$ is the instantaneous value of the equilibrium temperature and $T_a$ is the instantaneous value of the ambient temperature. Likewise, X% below equilibrium refers to a temperature which is equal to the instantaneous value of the equilibrium temperature minus $$\frac{X}{100}(T_e - T_a)$$

Under actual conditions the temperature rise of the body very closely follows an exponential curve, as above described. However, when applied to a thermally responsive element located in a heating appliance such as a toaster, the heat input during the first few instants is somewhat less than the heat input a short time later, due to the mass of the heating elements, and consequently a small portion of the curve at its inception departs slightly from the exponential, though this is of no practical significance in the present consideration. The value of the time constant in any particular construction depends upon very many conditions which may be reduced to a mass (or heat capacity) factor and a heat dissipation factor. Since the heat capacity of any material is proportional to its mass and the heat dissipation factor is roughly proportional to its exposed surface (other things being equal), the time constant may be regarded as roughly proportional to the ratio of the weight (mass) to the exposed surface of the thermally responsive element. As a part of the heat dissipation factor, the nature of the finish of the exposed surface must, of course, be taken into consideration where radiant heat transfer is of importance as in the instant case.

The thermostatic strip 73, as well as those which will presently be described, have a ratio of weight to surface such as to give them a relatively low time constant, due to the fact that I desire to obtain a relatively large thermostatic deflection, for reasons presently to be described, and for the reason that such a thermal element is less dependent upon dimensional variations in the remainder of the toaster structure. For this reason, and also to obtain rapid cooling, in the present instance I use a relatively thin and long thermal element having a time constant of about 30 seconds.

I have found that by using such a thermal element and by arranging the device so that the pin 74 is released from the cam 83 when the temperature reaches a point in the region between the sloping and the horizontal portion of the exponential curve, and by oscillating the temperature of the element so as to permit the temperature thereof to drop and again rise to the same temperature through several cycles, I am enabled to substantially eliminate the variations in the timing interval due to variations in friction. I have obtained satisfactory results with this point approaching as near as about 80% above ambient temperature. I further discovered that if the thermally responsive element is operated to a temperature between about 70% and 50% above ambient temperature as indicated at G in Fig. 19, I am enabled to substantially completely compensate for normal changes in the line voltage applied to a cooking device.

Referring to Fig. 19, the curve AG represents the time temperature changes of the thermal element during the initial phase of the first cycle, the curve GN the cooling phase of this cycle, the curve NO the heat-up phase of the second cycle, and the curve OP the cooling phase of the second cycle. By operating in the region described above and by moving the thermally responsive element through two cycles in each toasting interval (under the conditions herein described), highly improved voltage compensation will be obtained. The explanation for this is as follows: Under a drop in voltage applied to the toaster, a slight increase in the resultant toasting period is necessary to assure uniform toasting results. However, the necessary increase in the toasting interval expressed as a percentage is slightly larger than the percentage decrease in heat input (wattage). Because of this relationship, it is necessary in order to obtain proper voltage compensation to operate slightly beyond an essentially linear portion of the temperature rise curve.

In order to accomplish the desired results, I further locate and arrange the thermal element in such manner that the cooling thereof will proceed at a much faster rate than the heating, as will be seen from comparison of the slope of line GN and line AG of Fig. 19. The reason for this is that I desire the toasting interval to become shorter as the toaster becomes warmer, or as the voltage increases. However, as the toaster becomes warmer or as the voltage increases, the thermal element will heat up faster and cool slower. If the heating phase of the cycle is equal to the cooling phase in duration, an increase in ambient temperature will reduce the heating time by approximately the same amount as the increase in cooling time and result in no net change in the toasting interval. For best results, it is advisable that the cooling phase of the cycle be about one-fifth of the total cycle or less. Where the cooling is accomplished primarily by convection and radiation, it is necessary for the thermal element to operate within a temperature range substantially higher than the highest possible temperature of its surroundings. I have found that advantageously to accomplish the results herein described, this cooling should proceed through a range of not more than about 60% to a temperature of more than about 20% above ambient, and to obtain the full benefit of the invention the cooling should be through about 30% to a temperature more than about 30% above ambient as shown at N and O for example, in Fig. 19, where two-cycle operation is employed. Under such conditions, highly improved compensation is obtained for the change in initial temperature of the toaster. These figures apply to a toaster of the essential construction shown. In the case of other types of construction, where there may be more or less variation in required toasting time between the initial and heated condition, these figures must be modified accordingly.

A further result obtained by cooling the thermal element to a temperature substantially above that of its surroundings, is the improved compensation under varying waiting periods. Under such waiting periods, by causing the thermal element to continue to dissipate heat to the surroundings, I am enabled to cause the subsequent interval following such a waiting period to be properly prolonged over that which would occur if there were no waiting period to compensate for cooling of the heating elements and the toaster during the waiting period. This can be seen from Fig. 19, in which the line PM shows the cooling of the element and the longer toasting interval as represented by the time $T_3$ as compared with the time $T_2$.

It will also be apparent from Fig. 19 that the thermostat gives improved compensation for the change in initial toaster temperature due to its plural cycle operation. In this figure the symbol $T_1$ represents the initial toasting period when toasting is begun with a toaster at room temperature, while $T_2$ represents a toasting period almost immediately following $T_1$. $T_3$ represents a toasting period which occurs in case the second toasting period followed a waiting interval until point M, and shows the corresponding increase in value of $T_3$ as compared with $T_2$, which increase is necessary because of the partial cooling of the toasting chambers during the waiting interval.

It is also necessary that the heat output of the secondary heating element 58 be so adjusted that the total toasting interval will have expired at the conclusion of the pre-selected number of cycles. It will be understood, of course, that the mechanism can be so arranged as to terminate the toasting interval at the close of either a heating or a cooling phase, as may be desired, the various factors being adjusted accordingly in accordance with the above teachings.

Figures 12, 13:
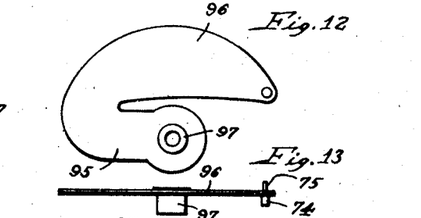
Fig. 12 is a side view of a modified form of thermostat element.
Fig. 13 is a top view thereof.
Figure 14:
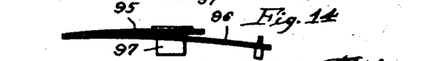
Fig. 14 is a view similar to Fig. 13 showing the thermostat element in a distorted position.

Referring now to Figs. 12 to 14, inclusive, I have shown a thermostat element of ply metal, preferably the customary bimetal, adapted to function in the place of the ply metal element 73 and the supporting arm 72. In this instance the element is formed substantially entirely of ply metal and has ply metal arms 95 and 96 formed from a single piece of metal, the free end of the arm 95 having a collar 97 for attachment to the pin 66, the arm 96 being formed with one end integral with the opposite end of the arm 95 and projecting in general parallel relation with the arm 95. The free end of the arm 96 carries pins 74 and 75 as in the form shown in Figs. 8 to 11. This form of the thermostat element is of particular merit where the number of cycles through which the thermostat moves during a cooking interval is small. In other words, if the thermostat is arranged for actuation of the switch upon a half turn or a full turn of the pin 66, this construction is of merit in that the bimetal arm 95 serves to compensate for ambient temperature within the cooking device, the thermostat warping as illustrated in Fig. 14 to delay the opening of the switch as the ambient temperature increases. Under some circumstances this form may be advisable even though the thermostat element is bodily moved through a plurality of cycles where compensation is desired. However, the form shown in Figs. 8 to 11 functions satisfactorily and normally requires no temperature compensation aside from that which is inherent in its operation.

Figure 15:
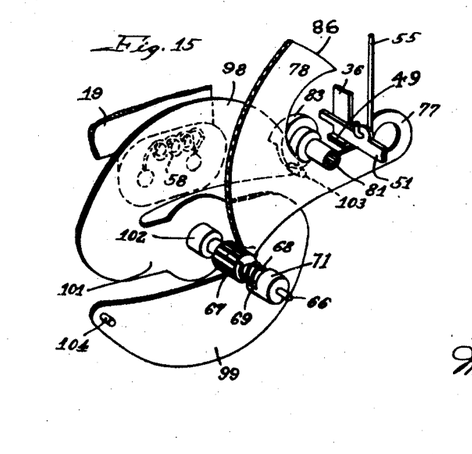
Fig. 15 is a view similar to Fig. 8 showing a third form of thermostat element and associated parts.

In Fig. 15 I have shown a still further form in which the thermostat element is of ply metal, preferably conventional bimetal and has arms 98 and 99 and a centrally disposed arm 101. A collar 102 is attached to the arm 101 midway between its ends so that the thermostat rotates as a disk. The thermostat is preferably stamped from a single piece of ply metal so that the parts are all uniform. The arms 98 and 99 have pins 103 and 104 positioned adjacent their ends. In this form of the invention the stops or abutments 91 and 92 are entirely absent. In this case when the segment 78 is forced downward to its lowermost position corresponding to that shown in Fig. 10 the abutment 103 engages the cam 83. The arm 98 thereupon warps so as to withdraw the pin 103 from engagement with the cam, whereupon the thermostat element rotates through a half revolution or until the pin 104 engages the cam 103. This brings the arm 99 into the heating position opposite the coil 58 and the arm 98 into cooling position occupied by the arm 99 in Fig. 15. The cycle is repeated until the edge 93 of the gear segment 78 raises the latch 51 and opens the switch. This form of the invention provides compensation for ambient temperature in the central arm 101 which functions in a manner analogous to the arm 95 of Fig. 12.

Figures 16, 17:
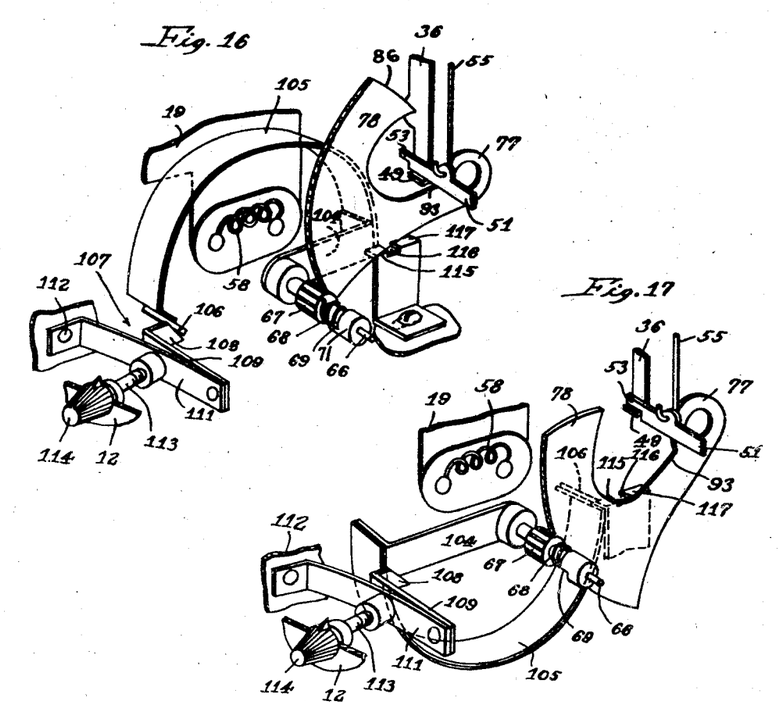
Fig. 16 is a perspective fragmentary view of a further embodiment of the control mechanism showing the parts in their normal "off" position.
Fig. 17 is a view similar to Fig. 16 showing the parts at an intermediate position.
Figure 18:
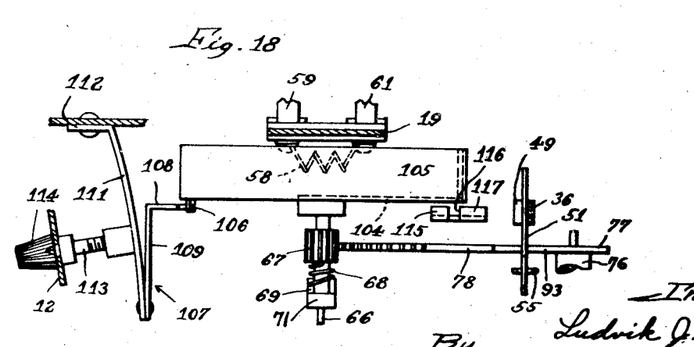
Fig. 18 is a top view of the embodiment shown in Fig. 16.

In the embodiment shown in Figs. 16 to 18 I have shown a form in which the thermostatic or bimetal strip is curved with its side faces in the form of a cylinder concentric with respect to the pin 66. In this form the pin 66 has a rigid arm 104 to one end of which is secured the curved bimetal band 105. The free end of the band has a pin 106 projecting from the edge of the strip adapted to engage suitable abutments in response to thermostatic movement of the band 105. While the band 105 may be arranged either to increase or decrease its radius with increase in temperature, in this instance the metals are so arranged that the radius of the arc decreases with increase in temperature occasioned by the operation of the heating coil 58. A stop 107 has a finger 108 adapted to lie in the path of the pin 106 and an arm 109 connected at one end to a flexible spring member 111, which is in turn secured at 112 to a stationary portion of the toaster. The finger 108 is adjusted by distorting the spring member 111 by means of a screw 113 seated in the wall of the casing 12 and having a knurled knob 114 secured thereto for rotating the screw from the exterior of the casing. Adjustment of a knob 114 serves to control the degree of toasting and consequently the color of the toast. Fig. 16 shows the normal starting position when the current is applied to the coil 58, as heretofore described. As the band 105 heats up, the pin 106 moves inward and at a predetermined temperature clears the finger 108, whereupon the pin 66 rotates in response to drive from the segment 78 which has been moved to the lower position as heretofore described upon initiation of the toasting operation. The pin 66 and band 105 make a half revolution until the pin 106 strikes an abutment 115. As a result of this movement, the band 105 is brought to the position shown in Fig. 17, below the coil 58 and in a position to be cooled by upward movement of cool air. The pin 106 during cooling gradually moves outward until it passes through a slot 116 between the abutment 115 and an abutment 117, whereupon the band, the pin 66 and associated parts make another half turn bringing the band into the position shown in Fig. 16. The cycle is repeated, as heretofore described, until the edge 93 of the segment 78 actuates the switch in the manner described. The abutment 107 serves to stop rotation of the pin 66 and the band 105 when the segment 78 is moved to its lowermost position in a manner analogous to the stop 91. The stop 107 is in this instance shown as being formed of bimetal, and may be formed of bimetal or not, as desired, bimetal in this instance being used for the purpose of giving a certain amount of temperature responsive correction to the thermostat action in response to change in the ambient temperature of the toaster.

The advantages of the invention will be apparent to those skilled in the art from the foregoing discussion. The control mechanism is such that the variations in line voltage and in the ambient temperature of the toaster are automatically compensated for. The construction is such as to provide a comparatively small contact pressure between the thermostat element and its stops while at the same time to provide a comparatively large amount of power for the actuation of the switch mechanism. It provides an instantaneously operating thermostat mechanism through the use of conventional ply metal elements in such manner that the element is not stressed as is necessary in snap acting thermostats. Furthermore, the thermostat mechanism may be made highly sensitive within any particular temperature range by proper selection of the thermostat element. It permits of adjusting the ratio of the heating to the cooling time by adjustment of the relative positions of the stops comprising the cam 83 and the stop 92. The arrangement is such that a single thermostat element is used for the control of each of the cooking intervals, that is, each cooking interval is controlled by the warpage of the same piece of thermostat metal whereby higher uniformity is obtained and the errors and expense due to the use of plural thermostats is avoided.

While I have thus described and illustrated a specific embodiment of the invention, numerous alterations may be made therein embodying the teachings of this invention, and I do not wish to be limited except as required by the prior art and the scope of the appended claims, in which I claim:

1. The combination in a temperature responsive control mechanism of a heating element, a temperature responsive element, means for moving one of said elements bodily between a position in which the temperature responsive element is heated by said heating element and a remote cooling position, means for releasing said bodily movable element from said positions at predetermined temperatures in response to heating and cooling of the temperature responsive element, controlled means adapted to be moved for control purposes, and means responsive to bodily movement of said element for moving said controlled means.

2. The combination in a temperature responsive control mechanism of a heating element, a temperature responsive element, means for moving one of said elements bodily between a position in which the temperature responsive element is heated by said heating element and a remote cooling position, stop means for terminating movement of said bodily movable element in each of said positions, means for releasing said bodily movable element from each of said stop means at predetermined temperatures for movement to the other of said positions, means for adjusting each of said stop means to regulate the temperature of release, controlled means adapted to be moved for control purposes, and means responsive to bodily movement of said element for moving said controlled means.

3. The combination in a temperature responsive control mechanism of a heating element, a temperature responsive element, means for moving one of said elements bodily between a position in which the temperature responsive element is heated by said heating element and a remote cooling position in which said element is cooled for return to the heating position, stop means for terminating movement of said bodily movable element in each of said positions, means for releasing said bodily movable element from each of said stop means in response to the temperature responsive element at predetermined temperatures of said temperature responsive element for movement to the other of said positions, controlled means adapted to be moved for control purposes, means responsive to bodily movement of said element for moving said controlled means, and means for manually resetting said first mentioned means for successive operation of the controlled means.

4. The combination in a temperature responsive control mechanism for operation in repeated timing intervals of a heating element, a temperature responsive element, means for supporting one of said elements for bodily movement between a position in which the temperature responsive element is heated by said heating element and a remote cooling position in which said temperature responsive element is cooled, means for driving said bodily movable element between said positions through a plurality of operations in each timing interval for reheating and recooling said temperature responsive element, stop means operated by said temperature responsive element for stopping movement of said bodily movable element in each of said positions and for releasing the same therefrom at predetermined temperatures, and controlled means arranged to be actuated by said driving means in response to the completion of said plurality of operations.

5. The combination in a temperature responsive control mechanism of a heating element, a temperature responsive element, means for supporting one of said elements for bodily movement between a position in which the temperature responsive element is heated by said heating element and a remote cooling position, spring means for driving said bodily movable element between said positions through a plurality of operations, stop means operated by said temperature responsive element for stopping movement of said bodily movable element in each of said positions and for releasing the same therefrom at predetermined temperatures, controlled means arranged to be actuated by said driving means in response to the completion of said plurality of operations, and manually operable means for repositioning said driving means and said controlled means and for retensioning said spring.

6. The combination in a temperature responsive control mechanism of a heating element, a temperature responsive element, means for supporting one of said elements for bodily rotation between a position in which the temperature responsive element is heated by said heating element and a remote cooling position, spring tensioned geared means for rotating said bodily movable element in one direction between said positions through a plurality of operations, stop means operated by said temperature responsive element for stopping movement of said bodily movable element in each of said positions and for releasing the same therefrom at predetermined temperatures, controlled means arranged to be actuated by said driving means in response to the completion of said plurality of operations, and manually operable means for re-positioning said geared means including a ratchet connection between said bodily movable member and said geared means for movement of the latter independently of the bodily movable member.

7. The combination in a temperature responsive control mechanism of a heating element, a temperature responsive element, a shaft for supporting said temperature responsive element adapted upon rotation to move the same bodily between a position in which the temperature responsive element is heated by said heating element and a remote cooling position, a pinion on said shaft having a ratchet connection therewith, a gear segment engaging said pinion spring pressed to drive said pinion in one direction and to ratchet said pinion with respect to said shaft when moved in the opposite direction, a stationary stop, a movable stop on said temperature responsive element positioned to engage and disengage said stationary stop upon temperature responsive movement of said temperature responsive element in opposite directions whereby to index said temperature responsive element through a circular cycle under the action of said spring in response to heating and cooling of the temperature responsive element, and switch means actuated by said segment at a predetermined point in its travel.

8. The combination recited in claim 7, wherein means are provided for adjusting the stationary stop to predetermine the temperature at which the temperature responsive element moves between said positions.

9. The combination recited in claim 7, wherein manually operable means is provided for rotating said segment to tension said spring independently of motion of said shaft.

10. The combination in an electrical cooking device of heating elements therefor, and means for terminating the cooking interval thereof to produce a uniform cooking effect during successive intervals comprising a thermostat mechanism positioned and supported to move through a plurality of cycles, each cycle involving movement of said thermostat mechanism from a heating position to a cooling position and back to the heating position, and means for terminating the cooking interval in response to the final movement of the last cycle of said plurality.

11. The combination in an electrical toaster of heating elements therefor and means for terminating the toasting interval thereof to produce toast of uniform color through successive toasting intervals comprising a switch adapted to be opened and closed to control the flow of current to the toaster, a member spring pressed to move from a tension position to an inoperative position, means for opening said switch in response to movement of said member near the end of said movement, and escapement means for imparting intermittent step by step movement to said member including a temperature responsive element positioned to be subjected to the ambient temperature of the toaster, means for alternately subjecting said element to heat proportional to the heat generated by said heating elements and to a cooling action to impart temperature responsive movement thereto in opposite directions, and means for successively releasing said member in response to movement of said element to predetermined temperature positions during the heating and cooling thereof.

12. The combination recited in claim 11 wherein means are provided for manually closing said switch and moving said member to the spring tension position simultaneously with the insertion of bread into the toaster.

13. The combination recited in claim 11 wherein means are provided for adjusting said predetermined temperature positions to vary the toasting interval.

14. The combination in a temperature responsive control mechanism of a heating element, a temperature responsive element comprising a strip of thermostatic metal bent transversely of its length to span the heating element, means for supporting said temperature responsive element for bodily movement between a position above the heating element for heating and a position therebelow for cooling, spring means for driving said bodily movable element between said positions, stop means operated by said temperature responsive element for stopping movement of said bodily movable element in each of said positions and for releasing the same therefrom at predetermined temperatures in response to heating and to cooling of temperature responsive element.

15. The combination in an electric cooking appliance of heating means therefor, a temperature responsive element subject to the ambient temperature thereof, means for alternately subjecting said temperature responsive element to heating and cooling action during each cooking interval, means urged to move progressively, means responsive to temperature responsive movement of said temperature responsive element upon heating thereof to a predetermined temperature and then upon cooling thereof to a predetermined temperature for controlling said moving means to progress in step by step fashion with each change in direction of temperature responsive movement of said temperature responsive element, and means for terminating the cooking operation positioned to be actuated by said moving means at a predetermined point in the travel thereof after a succession of said heating and cooling steps.

16. The combination in a cooking device adapted for successive operations, of heating means therefor, a member spring pressed to move from a tensioned to an inoperative position during each of said operations, stop means for restraining movement of said member, temperature responsive means arranged to release and engage said stop means upon heating of said temperature responsive means to a predetermined temperature and again to release and engage said stop means upon cooling of said temperature responsive means to a predetermined temperature to provide step by step movement of said member from said tensioned to said inoperative position, means for terminating the cooking interval, and means for actuating said terminating means from said member toward the end of said movement.

17. The combination in an electric cooking device of heating means therefor, a thermostat element and a heating element at least one of said elements being supported for rotation, a member for driving said rotatably supported element spring pressed to move from a tensioned to an inoperative position, stop means for normally restraining movement of said rotatably supported element, said thermostat element being positioned to successively release said rotatably supported element from said stop at predetermined alternating heated and cooled temperatures for step by step movement between said positions, for terminating the cooking interval, and means for actuating said terminating means from said member toward the end of said movement.

18. The combination in an electric cooking device of heating means therefor, a thermostat element and a heating element therefor, at least one of said elements being supported for rotation, a member for driving said rotatably supported element spring pressed to move from a tensioned to an inoperative position, stop means for normally restraining movement of said rotatably supported element, said thermostat element being positioned to successively release said rotatably supported element from said stop during a cooking interval at predetermined alternating heated and cooled temperatures for step by step movement between said positions, means for terminating the cooking interval, and means for actuating said terminating means from said rotatably supported element toward the end of said movement, and means adjusting said stop for varying said predetermined temperatures and the time required for said member to travel between said positions.

19. The combination in a temperature responsive control mechanism of a thermostat element adapted to warp in opposite directions upon heating and upon cooling, and a heating element, at least one of said elements being supported for rotation, a member for driving said element spring pressed to move from a tensioned to an inoperative position, means for normally restraining movement of said element, means for releasing said element for rotation a fixed distance when the thermostat element reaches a predetermined high temperature and for simultaneously terminating the heating thereof, means for releasing said element for further rotation a fixed distance when the thermostat element reaches a predetermined low temperature and for simultaneously re-establishing the heating thereof, whereby said member moves in step by step fashion, controlled means, and means for actuating said controlled means from said member toward the end of its movement.

20. The combination in a temperature responsive control mechanism comprising controlled means to be moved for control purposes, a member spring pressed to move said controlled means, and escapement means for imparting intermittent step by step movement to said member including a temperature responsive element, a heating means for alternately subjecting the thermostat element to separate heating and cooling actions in separate timing phases to impart temperature responsive movement thereto in opposite directions, at least one of said elements being supported for rotation under the action of said member, and means for successively releasing the rotative element for rotation in response to movement of the thermostat element to predetermined heated and cooled temperature positions.

21. A thermal timer employing a thermostat of relatively low time constant as described comprising, in combination, a thermally responsive element having a low ratio of mass to surface area, means for heating said thermally responsive element, means for interrupting the supply of heat to said element when it reaches a temperature much higher than the ambient temperature of the thermal timer and less than about 80% of the temperature range between said ambient temperature and the equilibrium temperature of the thermal timer and for reestablishing said supply of heat when the element is cooled to not less than about 20% of said temperature range above said ambient temperature to thereby cause thermally responsive movement of said element first in one direction and then in the opposite direction through rising and falling phases of a temperature cycle, and controllable means actuated in response to a phase of movement of said thermally responsive element subsequent to the first phase.

22. A thermal timer employing a thermostat of relatively low time constant as described comprising, in combination, a thermally responsive element having a time constant at least equal to the value of the timing period of the thermal timer divided by the number of cycles of operation thereof in the total timing period, means for controlling the application of heat to said thermally responsive element to cause it to be alternately heated and cooled within a range of temperature defined at opposite limits by the ambient temperature and the equilibrium temperature of the thermal timer and between about 20% and 80% of the temperature of said range above said ambient temperature to thereby cause thermally responsive movement of said element first in one direction and then in the opposite direction in separate timing functions, and controllable means actuated in response to a movement of said thermally responsive element subsequent to the second successive movement.

23. In a cooking device, in combination, heating means controllable in its application to the cooking device for successive cooking operations, a thermal timer for controlling said application of the heating means having a total timing period for each cooking operation, said total timing period consisting of a plurality of cycles each having a heating and a cooling phase, the thermal timer including a thermally responsive element having a time constant at least equal to the value of the total timing period of said thermal timer divided by a number of cycles of operation thereof in said total timing period, means for causing the thermally responsive element to be alternately heated and cooled within a range of temperature defined at opposite limits by the ambient temperature and the equilibrium temperature of the thermal timer and between about 20% and 80% of the temperature of said range above said ambient temperature to thereby cause thermally responsive movement of said element first in one direction and then in the opposite direction in separate timing functions, and means actuated in response to a movement of said thermally responsive element subsequent to the second successive movement to terminate a cooking operation.

24. A thermal timer employing a thermostat of relatively low time constant as described comprising, in combination, a thermally responsive element having a low ratio of mass to surface area, means for heating said thermally responsive element, means for interrupting the supply of heat to said thermally responsive element when it reaches a temperature much higher than the ambient temperature of the thermal timer and between about 50% to 80% of the temperature range between said ambient temperature and the equilibrium temperature of the thermal timer and for reestablishing the supply of heat thereto when said element is cooled to about 30% above the ambient temperature to cause thermally responsive movement of said element first in one direction and then in the opposite direction through rising and falling phases of a temperature cycle, and controllable means actuated in response to a phase of movement of said thermally responsive element subsequent to the first phase.

25. A thermal timer comprising, in combination, a heater, a thermostat element, and means constructed and arranged to move the thermostat element through a plurality of successive cycles the sum of which constitutes a total time period, each cycle including movement of the thermostat element from a heating position in which said element is responsive to heating by said heater, to a cooling position remote from said heater, and back to said heating position, and means for terminating said total time period in response to movement of the heating element to one of said positions after movement through a plurality of said cycles.

26. A thermal timer comprising, in combination, a heater, a thermostat element, and means constructed and arranged to move the thermostat element in a succession of cycles the sum of which constitutes a total time period, each successive cycle including movement of the thermostat element from a heating position in which said element is responsive to heating by said heater to a cooling position remote from said heater, and means for terminating the total timing interval in response to the movement of the thermostat element through a plurality of said heating and cooling cycles.

27. A thermal timer comprising, in combination, electric heating means, a thermally responsive element having a low ratio of mass to surface area, and control means providing heat transfer relation between the heating means and the thermally responsive element to effect plural successive cycles of heating said element in a timing function and cooling said element in a timing function to obtain timing results substantially free from the effects of ordinary voltage variation.

28. A thermal timer comprising, in combination, electric heating means, a thermally responsive element having a low ratio of mass to surface area, and control means providing heat transfer relation between the heating means and the thermally responsive element to effect heating of said element in a timing function followed by cooling of said element in a timing function and followed by an additional timing function at least by heating of said element, the sum of all said timing functions constituting the total time period, whereby to obtain timing results substantially free from the effects of ordinary voltage variation.

29. A thermal timer as set forth in claim 28, in which the thermally responsive element has a portion primarily responsive to heat from the heating means and a portion primarily responsive to the ambient temperature and coacting with the first mentioned portion to compensate for the ambient temperature.

30. A thermal timer employing a thermostat of relatively low time constant as described, comprising, in combination, a thermally responsive element having a low ratio of mass to surface area, electric heating means, means controlling the heat transfer relationship between the heating means and the thermally responsive element whereby said element is alternately responsive to separate heating and cooling actions to thereby cause thermally responsive movement of said element first in one direction and then in the opposite direction in separate timing functions, and controllable means actuated as a result of a predetermined plurality of successive said heating and cooling functions whereby to effect predetermined timing results substantially free from the effects of ordinary voltage variation.

31. A thermal timer employing a thermostat of relatively low time constant as described comprising, in combination, a thermally responsive element having a low ratio of mass to surface area, electric heating means, and means controlling the heat transfer relationship between the heating means and the thermally responsive element whereby said element is alternately responsive to separate heating and cooling actions to thereby cause thermally responsive movement of said element first in one direction and then in the opposite direction in separate timing functions, and combining a plurality of said heating and cooling timing functions in a total time period whereby to effect predetermined timing results substantially free from the effects of ordinary voltage variation.

32. Temperature responsive control mechanism having, in combination with heating means, a strip of thermostatic material adapted to deflect laterally in opposite directions in response to heating and cooling, means supporting the strip so that it is movable about an axis of rotation between a heating position in which the strip is responsive to heat from said heating means and a cooling position remote from the heating means, the thermostatic strip being disposed in a plane substantially at right angles to said axis of rotation and its said lateral deflection being in a direction substantially normal to said plane.

33. Temperature responsive control mechanism as set forth in claim 32, in which the thermostatic strip is of substantially arcuate shape extending from end to end through substantially 180° about said axis of rotation.

34. Temperature responsive control mechanism as set forth in claim 32, in which the thermostat strip is shaped to provide a plurality of thermally responsive portions each of arcuate shape and spaced apart circumferentially about said axis of rotation.

35. Temperature responsive control mechanism as set forth in claim 32, in which the thermostatic strip is shaped to provide a thermostatic portion extending radially from said axis of rotation and another thermostatic portion of arcuate form united to the outer end of the first mentioned portion, the second mentioned thermostatic portion being moved by rotation about said axis into and out of primary temperature responsive relation to the heating means and the first mentioned thermostatic portion being responsive to the ambient temperature and serving to compensate for changes in said ambient temperature.

36. Temperature responsive control mechanism as set forth in claim 32, in which the thermostatic strip is shaped to provide a plurality of thermally responsive portions extending radially with relation to said axis of rotation and a thermostatic portion of arcuate shape on the outer end of each said radially extending portion, said arcuately shaped portions being movable in succession into said heating relation to the heating means by rotative movement of the thermostatic strip about said axis of rotation.

LUDVIK J. KOCI.

REFERENCES CITED

The following references are of record in the file of this patent:

UNITED STATES PATENTS

| Number | Name | Date |
|---|---|---|
| 2,180,233 | Graham | Nov. 14, 1939 |
| 2,234,764 | Ireland | Mar. 11, 1941 |
| 1,795,013 | Denman | Mar. 3, 1931 |
| 2,332,171 | Sardeson | Oct. 19, 1943 |